(12) United States Patent
Watson et al.

(10) Patent No.: US 11,044,462 B2
(45) Date of Patent: Jun. 22, 2021

(54) SELF-SUPERVISED TRAINING OF A DEPTH ESTIMATION MODEL USING DEPTH HINTS

(71) Applicant: Niantic, Inc., San Francisco, CA (US)

(72) Inventors: James Watson, London (GB); Michael David Firman, London (GB); Gabriel J. Brostow, London (GB); Daniyar Turmukhambetov, London (GB)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 16/864,743

(22) Filed: May 1, 2020

(65) Prior Publication Data

US 2020/0351489 A1    Nov. 5, 2020

Related U.S. Application Data

(60) Provisional application No. 62/842,531, filed on May 2, 2019.

(51) Int. Cl.
*H04N 13/268* (2018.01)
*G06T 7/593* (2017.01)
(Continued)

(52) U.S. Cl.
CPC .......... *H04N 13/268* (2018.05); *G06T 7/593* (2017.01); *G06T 7/73* (2017.01); *G06T 7/85* (2017.01);
(Continued)

(58) Field of Classification Search
CPC ............................. H04N 13/628; G06T 7/593
See application file for complete search history.

(56) References Cited

U.S. PATENT DOCUMENTS

| 2013/0077820 A1* | 3/2013 | Marais | G06K 9/6257 |
| | | | 382/103 |
| 2015/0302665 A1* | 10/2015 | Miller | A63F 13/57 |
| | | | 345/419 |

(Continued)

FOREIGN PATENT DOCUMENTS

| CN | 102223553 A | 10/2011 |
| CN | 107067465 A | 8/2017 |

(Continued)

OTHER PUBLICATIONS

Garg, R. et al., "Unsupervised CNN for Single View Depth Estimation: Geometry to the rescue," European Conference on Computer Vision, Oct. 8, 2016, pp. 740-756.

(Continued)

*Primary Examiner* — Jerry T Jean Baptiste
(74) *Attorney, Agent, or Firm* — Fenwick & West LLP

(57) ABSTRACT

A method for training a depth estimation model with depth hints is disclosed. For each image pair: for a first image, a depth prediction is determined by the depth estimation model and a depth hint is obtained; the second image is projected onto the first image once to generate a synthetic frame based on the depth prediction and again to generate a hinted synthetic frame based on the depth hint; a primary loss is calculated with the synthetic frame; a hinted loss is calculated with the hinted synthetic frame; and an overall loss is calculated for the image pair based on a per-pixel determination of whether the primary loss or the hinted loss is smaller, wherein if the hinted loss is smaller than the primary loss, then the overall loss includes the primary loss and a supervised depth loss between depth prediction and depth hint. The depth estimation model is trained by minimizing the overall losses for the image pairs.

20 Claims, 6 Drawing Sheets

(51) Int. Cl.
*G06T 7/80* (2017.01)
*G06T 7/73* (2017.01)
*H04N 13/00* (2018.01)

(52) U.S. Cl.
CPC .............. *G06T 2207/10021* (2013.01); *G06T 2207/10028* (2013.01); *G06T 2207/20081* (2013.01); *H04N 2013/0081* (2013.01)

(56) References Cited

U.S. PATENT DOCUMENTS

2019/0139179 A1 5/2019 Wang et al.
2019/0325597 A1 10/2019 Chakravarty et al.
2020/0258249 A1 8/2020 Angelova et al.

FOREIGN PATENT DOCUMENTS

| CN | 107909150 A | 4/2018 |
| JP | 2015-087851 A | 5/2015 |
| KR | 10-2015-0140392 A | 12/2015 |
| WO | WO 2018/046964 A1 | 3/2018 |

OTHER PUBLICATIONS

Godard, C. et al., "Digging into Self-Supervised Monocular Depth Estimation," arXiv preprint arXiv:1806.01260, 2018, 18 pages.
Godard, C. et al., "Unsupervised Monocular Depth Estimation with Left-Right Consistency," Proceedings of the IEEE Conference on Computer Vision and Pattern Recognition, 2017, pp. 270-279.
International Search Report and Written Opinion, Patent Cooperation Treaty Application No. PCT/162020/054170, dated Jul. 27, 2020, 7 pages.
International Search Report and Written Opinion, Patent Cooperation Treaty Application No. PCT/US2019/032616, dated Sep. 26, 2019, 12 pages.
Ummenhofer, B. et al., "DeMoN: Depth and Motion Network for Learning Monocular Stereo," The IEEE Conference on Computer Vision and Pattern Recognition (CVPR), Jul. 26, 2017, pp. 5038-5047.
Zhou, T. et al., "Unsupervised Learning of Depth and Ego-Motion from Video," Proceedings of the IEEE Conference on Computer Vision and Pattern Recognition (CVPR), Jul. 26, 2017, pp. 1851-1858.
Uhrig, J. et al., "DeMoN: Depth and Motion Network for Learning Monocular Stereo," The IEEE Conference on Computer Vision and Pattern Recognition (CVPR), Jul. 26, 2017, pp. 5038-5047.
United States Office Action, U.S. Appl. No. 16/413,907, dated Sep. 18, 2020, nine pages.
IP Australia, Examination Report, AU Patent Application No. 2020266341, dated Dec. 16, 2020, seven pages.
Kuznietsov, Y. et al., 'Semi-supervised deep learning for monocular depth map prediction', arXiv:1702.002706, May 9, 2017, pp. 1-14.
Yang, N. et al., "Deep Virtual Stereo Odometry: Leveraging Deep Depth Prediction for Monocular Direct Sparse Odometry," arXiv:1807.02570, Jul. 25, 2018, pp. 1-17.

\* cited by examiner

SELF-SUPERVISED TRAINING OF A DEPTH ESTIMATION MODEL USING DEPTH HINTS

CROSS REFERENCE TO RELATED APPLICATIONS

This application claims the benefit of U.S. Provisional Application No. 62/842,531, filed May 2, 2019, which is incorporated by reference in its entirety for all purposes.

BACKGROUND

1. Technical Field

The subject matter described generally relates to estimating a depth map from a single-color input image, and in particular to training a machine-learned model for estimating the depth map trained using depth hints provided by another model.

2. Problem

Depth sensing has applications in both navigation and scene understanding. Many methods use trained models or networks to determine a depth map from a single-color input image. There are a few methods that use different kinds of training data for training the depth estimation system. A depth estimation system may be trained using a detection and ranging system to establish a ground truth depth for objects in an environment (i.e., radio detecting and ranging (RADAR), light detection and ranging (LIDAR), etc.) paired with images taken of the same scene by a camera. Although detection and ranging systems can provide a ground truth of depth of objects, constantly utilizing detection and ranging systems to sense depth of many different environments can be a costly endeavor in time and resources. Moreover, detection and ranging systems are unable to determine depth of some objects that may have material properties (e.g., reflective objects) that render them undetectable by the detection and ranging systems.

Another method of training a depth estimation system utilizes stereoscopic image pairs of the same scene. To capture stereoscopic image pairs at a single temporal instance depends on using two cameras focused on the same scene but located some distance apart. The depth estimation system operates through projecting from one of the stereoscopic images to the other stereoscopic image in the stereoscopic image pair. To project from one to the other, the depth estimation system considers the current stereoscopic image in addition to a disparity—a scaled inverse of depth—and a pose between the two images, i.e., a transform matrix between the perspectives of the two cameras used to take the stereoscopic image pair. In minimizing photometric reconstruction error of a projection compared to its captured stereoscopic image, the depth estimation system can determine depth of the scene.

Other methods train a depth estimation system utilizing monocular video data of an ever-changing scene. The depth estimation system trains by projecting from one temporal image in the monocular video data to a subsequent temporal image while minimizing a photometric reconstruction error. However, such systems may inaccurately account for objects coming into or going out of view from one temporal image to another which leads to artifacts in the depth map and around the depth map's border. Moreover, traditional systems currently input low-resolution images for determining depth maps prior to upsampling the depth maps, which is prone to depth upsampling artifacts.

The photometric error can be measured using various metrics, such as the L1 distance, L2 distance, structural dissimilarity (DSSIM) distance, or combinations of these distances. A drawback of self-supervised training is that finding the optimal depth value is often difficult, especially where the photometric loss can be low for multiple depth values. Consequently, training is harder, which may lead to lower accuracy predictions.

SUMMARY

The present disclosure describes training a depth estimation model using depth hints as an alternative to the model's current predictions. If a depth hint for a pixel results in a better reprojection (e.g., a lower photometric reconstruction error) than the depth output for the pixel from the model being trained, a contribution of the pixel to a loss is calculated using the depth prediction and the hint (e.g., in combination with the output from the model). If the depth hint does not result in a better reprojection, the training ignores the depth hint and determines the contribution of the pixel to the loss from the depth output from the model. The training process updates the model according to the loss (e.g., using backpropagation). Using these depth hints may improve the performance of the training process over using conventional training processes alone. Depth hints may be obtained from alternatively trained depth estimation models, e.g., trained by external systems.

A training system relies on self-supervised training algorithms with training image data. Self-supervised training does not require ground truth depth as opposed to supervised training. Training image data may be partitioned into image pairs. The image pairs may be true stereoscopic image pairs that are captured by binocular camera systems and/or pseudo stereoscopic image pairs from temporally distinct frames of monocular video data captured by a system with at least one camera. The training system inputs a first training image from an image pair to determine an initial depth prediction for the first training image. The training system projects the second training image of the image pair onto the first training image in the image pair to generate a synthetic frame based on at least the depth prediction of the first training image and a pose between the two training images. The training system projects the second training image onto the first training image a second time to generate a hinted synthetic frame based on a depth hint rather than the depth prediction for the first training image. The pose may be known from known positions of cameras used to take the training images, e.g., a known placement of the cameras in a binocular camera system. Otherwise, the pose may be estimated by a pose estimation model or a depth-pose hybrid model, e.g., in instances with monocular video data where temporally adjacent frames make up a pseudo stereoscopic image pair.

The accuracy of the projection process is based on at least the accuracy of the depth prediction of the first training image. As such, a primary loss may be defined according to the photometric reconstruction error between a synthetic frame and its corresponding training image. A hinted loss may be defined according to photometric reconstruction error between a hinted synthetic frame and the corresponding training image. An overall loss of an image pair sums loss contributions across all pixels. As described above, the training system may compare the primary loss and the hinted loss on a per-pixel basis to determine contribution by that pixel to the overall loss. If the primary loss value for a pixel is smaller than or equal to the hinted loss value, the training system ignores the hinted loss from the depth hint and the contribution to the overall loss is the primary loss value of that pixel. If the hinted loss value for the pixel is smaller than the primary loss value, the contribution to the overall loss is based on the primary loss value and a supervised depth loss between the depth prediction value of that pixel and the depth hint of that pixel. In one embodiment, the contribution is a sum of the primary loss value, and the supervised depth loss is an absolute difference between the model's depth prediction and the depth hint at that pixel.

In embodiments of training with stereoscopic image data, depth hints are used to project each stereoscopic image onto the other stereoscopic image in a stereoscopic image pair to generate hinted synthetic frames. Depth hints may be obtained from an alternatively trained depth estimation model, e.g., a stereo depth model configured to input a stereoscopic image and to output a single depth map. Depth hints may also obtained from a simultaneous-localization-and-mapping (SLAM) module that is configured to simultaneously generate maps and locate a client device within the generated map based on at least image data and some positioning data (e.g., global coordinates, acceleration data, odometry data, etc.).

In embodiments of training with monocular video data, depth hints and/or pose hints may be used during projection of one temporal image onto another temporal image to generate hinted synthetic frames. Depth hints may be obtained as described above. Pose hints may be obtained from an alternatively trained pose estimation model.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining depth information from image data is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
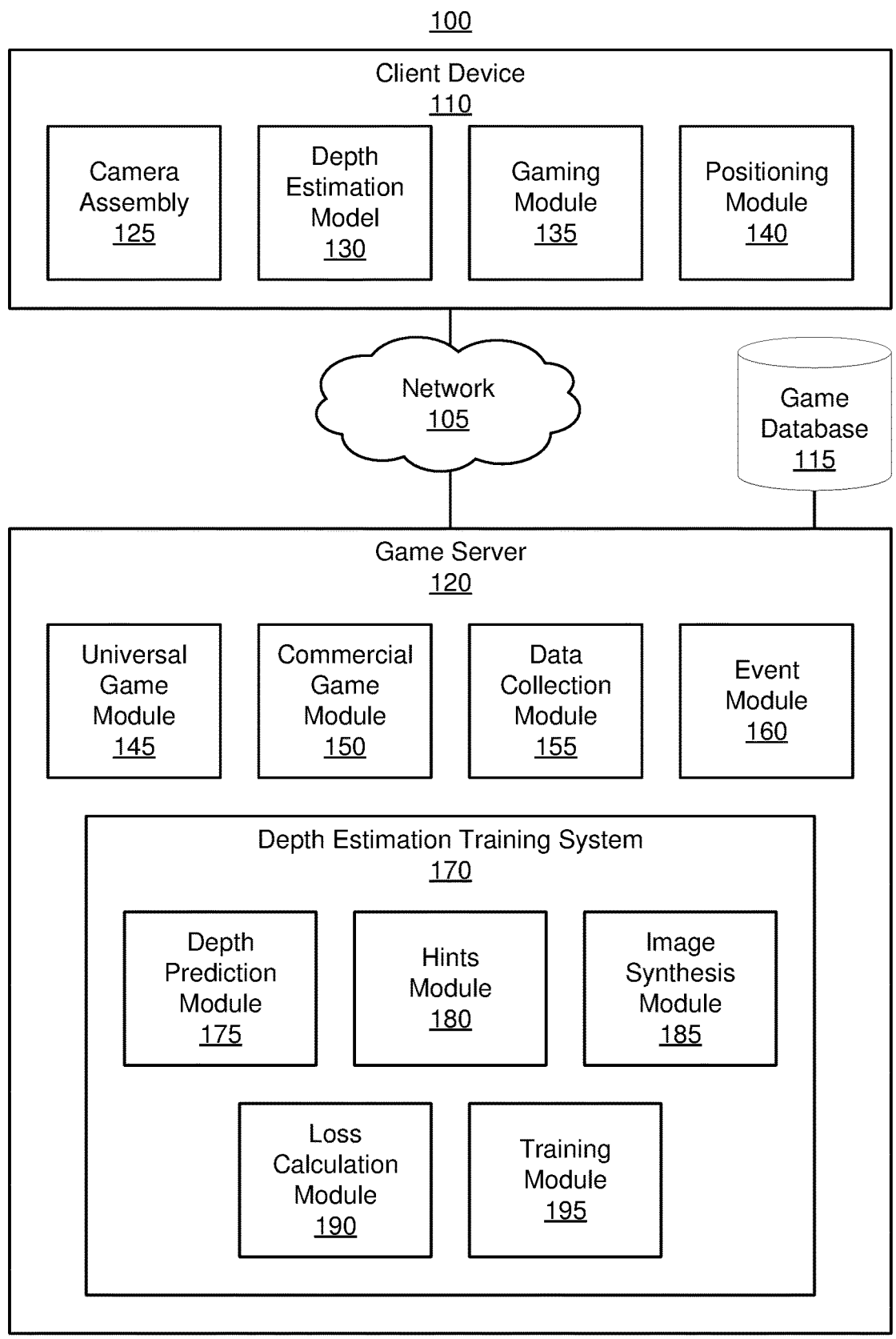
FIG. 1 illustrates a networked computing environment, in accordance with one or more embodiments.

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 120.

Figure 2:
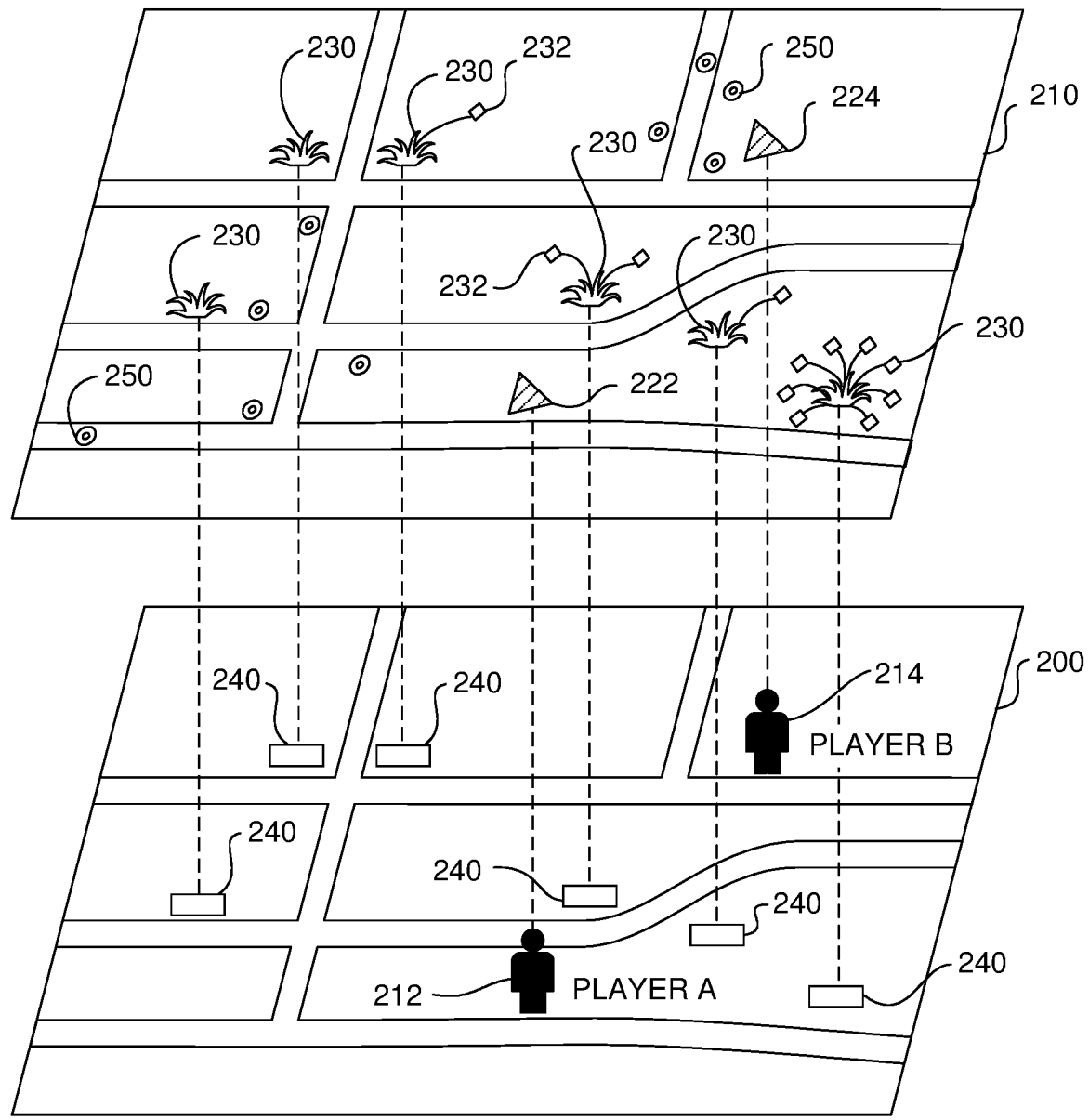
FIG. 2 depicts a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. The client device 110 also includes a depth estimation model 130 that is a machine learning model, e.g., trained by the game server 120. In the embodiment shown in FIG. 1, each client device 110 includes software components such as a gaming module 135 and a positioning module 140. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment where the client device 110 is in. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The depth estimation model 130 receives an input image of a scene and outputs a depth map of the scene based on the input image. The depth estimation model 130 is trained by a depth estimation training system 170 and can be updated or adjusted by the depth estimation training system 170, which is discussed in greater detail below. The received input image may be captured by a camera of the camera assembly 125 or another camera from another client device 110. In some embodiments, the received input image has metadata appended to the image specifying intrinsics of the input image. The intrinsics of an image refer to one or more geometric properties of the camera at a time when the image was captured, e.g., the focal length of the camera when capturing the image, the camera's principal point offset, the skew of the camera, etc. With the intrinsics, the depth estimation model 130 may generate an intrinsic matrix accounting for the intrinsics. In some embodiments, the depth estimation model 130 determines whether the input image is satisfactory, e.g., above a threshold resolution. If not, the depth estimation model 130 may perform one or more pre-processing techniques to ensure the input image is satisfactory, e.g., upsample the input image to a desired resolution prior to determining the depth map of the scene. Other example conditions include a contrast, a grain, a color scale, another characteristic of the image, etc. The depth estimation model 130 inputs the image (as received or after pre-processing) and determines a depth map of the scene.

The depth estimation model 130 is implemented with one or more machine learning algorithms. Machine learning algorithms that may be used for the depth estimation model 130 include neural networks, decision trees, random forest, regressors, clustering, other derivative algorithms thereof, or some combination thereof. In one or more embodiments, the depth estimation model 130 is structured as a neural network comprising a plurality of layers including at least an input layer configured to receive the input image and an output layer configured to output the depth prediction. Each layer comprises a multitude of nodes, each node defined by a weighted combination of one or more nodes in a prior layer. The weights defining nodes subsequent to the input layer are determined during training by the depth estimation training system 170. In one example architecture, the depth estimation model 130 may comprise a first set of layers termed a pose encoder configured to decrease a dimensionality from the input image to determine abstract depth features and a second set of layers termed a pose decoder configured to increase the dimensionality from the abstract depth features to output a depth map of the same dimensionality of the input image.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some other embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to a depth map (e.g., determined by the depth estimation model 130) of the scene captured in the image data.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on depth information (e.g., as determined by the depth estimation model 130).

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a depth estimation training system 170. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The depth estimation training system 170 trains a depth estimation model, e.g., the depth estimation model 130 provided to the client device 110. The depth estimation training system 170 receives image data for use in training the depth estimation model. Generally, the depth estimation training system 170 processes the image data, inputs the image data into the depth estimation model to generate a depth prediction, projects one training image onto another training image with the depth prediction, calculates a loss based on the photometric reconstruction error, and iteratively adjusts parameters of the depth estimation model to minimize the loss. The general process above describes a self-supervising training algorithm. Generally, the self-supervised training does not require ground truth depth for training as would generally be required for supervised training algorithms. The depth estimation system 170 trains the model in part based on depth hints provided by another model (e.g., an off-the-shelf depth estimation model). The depth estimation training system 170 may further define an error threshold for the depth estimation model which can be used to determine whether the depth estimation model is sufficiently accurate in estimating depth information. Training by the depth estimation training system 170 will be further described below.

Once the depth estimation model is trained, the depth estimation model receives image data and outputs depth information of the environment based on the image data. The depth estimation training system 170 provides the trained model to the client device 110. The client device 110 uses the trained model to estimate the depth of pixels in images (e.g., captured by a camera on the device). The depth estimates may have various uses, such as aiding in the rendering of virtual content to augment real world imagery, assisting navigation of robots, detecting potential hazards for autonomous vehicles, and the like.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
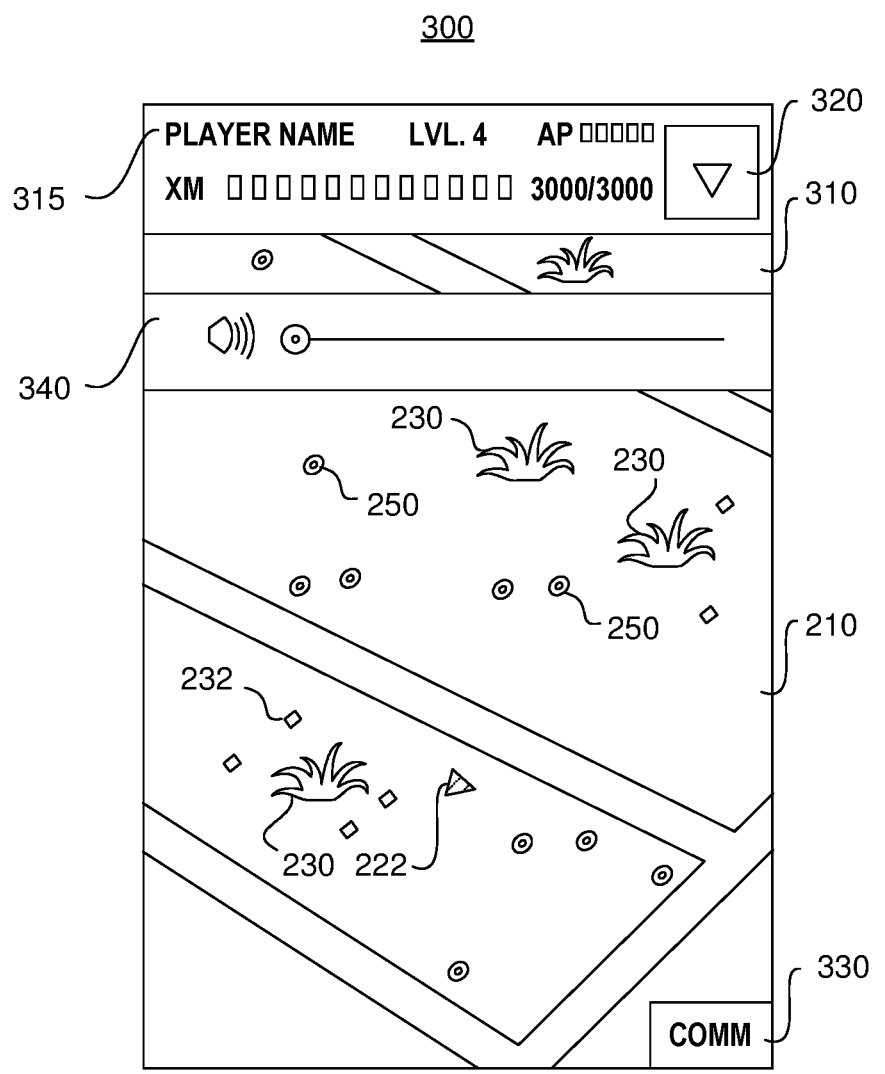
FIG. 3 depicts an exemplary game interface of a parallel reality game, in accordance with one or more embodiments.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Depth Estimation Training

The depth estimation training system 170 trains the depth estimation model 130 with the aid of depth hints for use by the client device 110. The following paragraphs describe various training methods relying on stereoscopic image data, monocular video data, depth hints, pose hints, or some combination thereof. A depth hint is a depth map generated by a different approach than the depth estimation model 130. One such approach is generation of a depth map from an alternative depth estimation model trained differently than the depth estimation model 130. For example, the alternative depth estimation model may be trained by a third-party system as a binocular depth estimation model configured to receive a stereoscopic image pair and generate a depth map based on the stereoscopic image pair. Another approach is generating a depth map with a simultaneous-localization-and-mapping (SLAM) module on a device (e.g., phone, autonomous vehicle). Regardless of how the depth hints are generated, the training phase yields a trained monocular depth estimation model 130 configured to receive an input image and to output a depth map based on the input image.

Generally, the depth estimation training system 170 trains with training image data coupled into image pairs. An image pair may be a true stereoscopic image pair or a pseudo stereoscopic image pair. On one hand, a true stereoscopic image pair comprises two images captured at relatively the same time by two different cameras, e.g., from a binocular camera system. On the other hand, a pseudo stereoscopic image pair comprises two temporally distinct frames (i.e., captured at different timestamps) captured by a single camera, e.g., two temporally adjacent frames from monocular video data captured by a monocular camera system. With true stereoscopic image pairs, a pose between stereoscopic images in an image pair is generally known. With pseudo stereoscopic image pairs, a pose between the two frames is generally unknown. Pose generally describes a relative positioning between two images. Mathematically speaking, a pose is defined by a transform matrix between the two perspectives of the images which may account for both translation and rotation between the two perspectives. To accommodate, the depth estimation training system 170 may also train a pose estimation model in addition to the depth estimation model. In some embodiments, a single depth-pose hybrid model for simultaneously estimating pose and depth may be used. United States Patent Publication No. 2019/0356905 A1, entitled "Self-Supervised Training of a Depth Estimation System" and published on Nov. 21, 2019, is incorporated herein by reference and further describes embodiments relating to the depth-pose hybrid model.

In the embodiment shown in FIG. 1, the depth estimation training system 170 includes a depth prediction module 175, a hints module 180, an image synthesis module 185, a loss calculation module 190, and a training module 195. In some embodiments, the depth estimation training system 170 further includes additional modules that perform additional operations. In other embodiments, the depth estimation training system 170 may include different and/or additional components, e.g., data stores, feedback modules, smoothing modules etc. For example, a data store may store training data or trained parameters. In another example, a smoothing module can process depth maps; one example of such is smoothing depth values in the depth map.

The depth prediction module 175 generates a depth prediction for a training image. The depth prediction module 175 provides a training image as input to the depth estimation model 130 to generate an initial depth prediction for the training image. The depth prediction is a predicted depth map comprising a predicted depth value for each pixel of the training image.

The hints module 180 obtains a depth hint for a training image. Depth hints, as mentioned above, may be obtained from some number of approaches. In one approach, an alternatively trained depth estimation model is used (e.g., an off-the-shelf depth estimation model with relatively low computational resource requirements). In embodiments with an alternatively trained stereo depth estimation model, the hints module 180 provides a training image pair to the alternatively trained stereo depth estimation model to generate a depth hint. In another approach, a SLAM module is used. In such embodiments, the hints module 180 obtains the depth hint generated by the SLAM module. In any other approach, the hints module 180 obtains the depth hint from the appropriate module, device, or system which generated the depth hint. In one or more embodiments, the hints module 180 may obtain multiple depth hints from some combination of the approaches above. In some embodiments, the hints module 180 obtains pose hints, which may be used for training with pseudo stereoscopic image pairs. The pose hints may be obtained from an alternatively trained pose estimation model, a SLAM module, or some other localization module.

The image synthesis module 185 generates one or more synthetic frames by projecting one training image onto another training image in an image pair. To generate a synthetic frame as a projection from a second training image onto a first training image in an image pair, the image synthesis module 185 uses the second training image, the intrinsic parameters of the second training image, the relative pose between the two training images, a depth map for the first training image, and the intrinsic parameters of the first training image. Generally, intrinsic parameters of a training image are known, as recorded by whichever camera captured the training image. The intrinsic parameters (also referred to as "intrinsics") of an image refer to the geometric properties of the camera used to capture that image, e.g., including the focal length of the camera, the camera's principal point offset, the skew of the camera. In some cases, the intrinsics can be constant for each camera between all images taken or the intrinsics can vary as the camera adjusts its parameters when taking various images. In either case, the intrinsics can be represented as an intrinsic matrix. In projecting true stereoscopic images, the image synthesis module 185 pose may be known according to configuration of the two cameras which captured the true stereoscopic images. In projecting monocular video data, the pose between the two temporally distinct frames may be estimated based on the training images, e.g., by a pose estimation model.

The image synthesis module 185 generates a model synthetic frame by first projecting using a depth prediction output by the depth estimation model 130. For clarity, the image synthesis module 185 projects from a second training image onto a first training image in a training image pair using the depth prediction output by the depth estimation model 130 for the first training image, such depth prediction generated by the depth prediction module 175.

For training image pairs with a depth hint, the image synthesis module 185 generates a hinted synthetic frame using a depth hint. For clarity, and following the example in the above paragraph, the image synthesis module 185 projects a second time from the second training image onto the first training image in the training image pair using the depth hint obtained by the hints module 180 rather than the depth prediction. As an example with a true stereoscopic image pair having known pose with a depth hint, the image synthesis module 185 generates a model synthetic frame and a hinted synthetic frame. In a like manner, to generate a hinted synthetic frame with a pose hint, the image synthesis module 185 projects from one training image onto the other training image in the image pair considering the pose hint in place of a pose estimated by a pose estimation model. As a natural extension, to use both a depth hint and pose hint, the image synthesis module 185 projects with the depth hint for the first training image and the pose hint between the two training images. Examples with pseudo stereoscopic image pairs having a depth hint and/or a pose hint, the image synthesis module 185 may generate multiple hinted synthetic frames: a first hinted synthetic frame according to a depth hint, a second hinted synthetic frame according to a pose hint, a third hinted synthetic frame with according to a depth hint and a pose hint, or some combination thereof. In embodiments with multiple of one type of hint (e.g., multiple depth hints), the image synthesis module 185 may generate one or more hinted synthetic frames for each depth hint.

The loss calculation module 190 calculates an overall loss for use in training the depth estimation model 130. First, the loss calculation module 190 computes a photometric reconstruction error between a model synthetic frame and a corresponding training image as a primary loss. The primary loss comprises a primary loss value per pixel in the training image describing an accuracy of photometric reconstruction according to the depth prediction at that pixel. An overall loss sums loss contributions across all pixels. For training image pairs without depth hints, the overall loss is based on the summation of the primary loss values. For example, the primary loss comprises a primary loss value per pixel, such that each pixel's contribution to the overall loss is the primary loss value, resulting in the overall loss for the training image pair being a summation of primary loss values.

For training image pairs with depth hints, the loss calculation module 190 further considers a hinted loss in calculating the overall loss. The hinted loss may be computed as a photometric reconstruction between a hinted synthetic frame and the corresponding training image. The hinted loss comprises a hinted loss value per pixel. The loss calculation module 190 compares the primary loss values and the hinted loss values on a per-pixel basis. If the primary loss value is smaller than or equal to the hinted loss value at a pixel (implying that the model's depth prediction is more or just as accurate than the depth hint at that pixel), then the loss calculation module 190 ignores the depth hint at that pixel, and the contribution of that pixel to the overall loss is based on the depth prediction, e.g., the contribution is the primary loss value. If the hinted loss value is smaller than the primary loss value at a pixel (implying that the depth hint is more accurate than the model's depth prediction at that pixel), then the loss calculation module 190 considers the depth hint, and the contribution of that pixel to the overall loss is based on the depth prediction and the depth hint. In one embodiment, the contribution of a pixel (having smaller hinted loss than primary loss) is a sum of the primary loss value and a supervised loss between the depth prediction value and the depth hint value at that pixel.

Various definitions of photometric reconstruction error may be implemented by the loss calculation module 190. At a high level, photometric reconstruction error of a depth is, generally speaking, a differential between a pixel of a synthetic frame projected according to the depth and the pixel of the image corresponding to the synthetic frame. Example definitions of photometric reconstruction error calculated for a depth at a pixel are L1 distance, L2 distance, structural dissimilarity (DSSIM) (which considers windows of pixels between the two images, e.g., 2×2, 3×3, 4×4, etc.), one or more operators applied thereto, or some combination thereof. Equations of one or more definitions for photometric reconstruction (pre) are provided below:

$$\text{pre}_{L1}(d_i) = |I_i - \tilde{I}_i|$$

Photometric reconstruction error for depth $d_i$ at pixel i as an L1 distance $\text{pre}_{L1}(d_i)$ is the absolute difference between the pixel i of a first image I and the pixel i of a second image $\tilde{I}$.

$$\text{pre}_{L2}(d_i) = (I_i - \tilde{I}_i)^2$$

Photometric reconstruction error for depth $d_i$ at pixel i as an L2 distance $\text{pre}_{L2}(d_i)$ is the squared distance between the pixel i of a first image I and the pixel i of a second image $\tilde{I}$.

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

$$\text{pre}_{DSSIM}(d_i) = \frac{1 - SSIM(I_i, \tilde{I}_i)}{2}$$

Photometric reconstruction error for depth $d_i$ at pixel i calculated as a structural dissimilarity $\text{pre}_{DSSIM}(d_i)$ is half of one minus a structural similarity calculation $SSIM(I_i, \tilde{I}_i)$ between corresponding windows of the two images I and $\tilde{I}$ centered about the pixel i. SSIM(x, y) is a computation for structural similarity between a window x from a first image and a corresponding window y of a second image both centered around pixel i. $\mu_x$ is the mean of window x, while $\mu_y$ is the mean of window y. $\sigma_x$ is the variance of window x; $\sigma_y$ is the variance of window y; and $\sigma_{xy}$ is the covariance between windows x and y. $c_1$ and $c_2$ are smoothing factors for the division, e.g., calculated based on the dynamic range of the pixel-values.

$$pre_{DSSIM+L1}(d_i) = 0.85 * \frac{1 - SSIM(I_i, \tilde{I}_i)}{2} + 0.15 * |I_i - \tilde{I}_i|$$

DSSIM+L1 definition of photometric reconstruction error incorporates photometric reconstruction errors of DSSIM and L1 as shown above. Other embodiments may use different percentages between the photometric reconstruction errors of DSSIM and L1.

Various definitions of supervised depth loss may be implemented by the loss calculation module 190. At a high level, a supervised depth loss is a differential between two depth predictions. Examples include the L1 distance, L2 distance, logarithm of L1 distance between two depth values, one or more operators applied thereto, or some combination thereof.

The training module 195 trains the depth estimation model 130 by minimizing the overall loss. The training module 195 trains through adjusting parameters of the depth estimation model 130 to minimize the overall loss of each training image pair. The training module 195 backpropagates through the depth estimation model 130, adjusting parameters of the depth estimation model 130 to minimize the overall loss. The training module 195 in some embodiments may perform iterative batch training, e.g., training the depth estimation model 130 batch-by-batch of training image pairs. A number of epochs for training determines a number of instances of feeding the training image data through the depth estimation model 130 forward and backward. Upon conclusion of training, the training module 195 may validate the depth estimation model 130 with a hold-out set of training image data with ground truth depth data to determine an accuracy of the trained depth estimation model 130.

The depth estimation training system 170 after training its models and modules with the training images can provide parameters for the depth estimation model 130 to receive a color input image and generate a depth map based on the parameters trained by the depth estimation training system 170. Note that, although the depth estimation training system 170 is shown as part of the game server 120 for convenience, some or all of the models may be trained by other computing devices and provided to client devices 110 in various ways, including being part of the operating system, included in a gaming application, or accessed in the cloud on demand.

Figure 4:
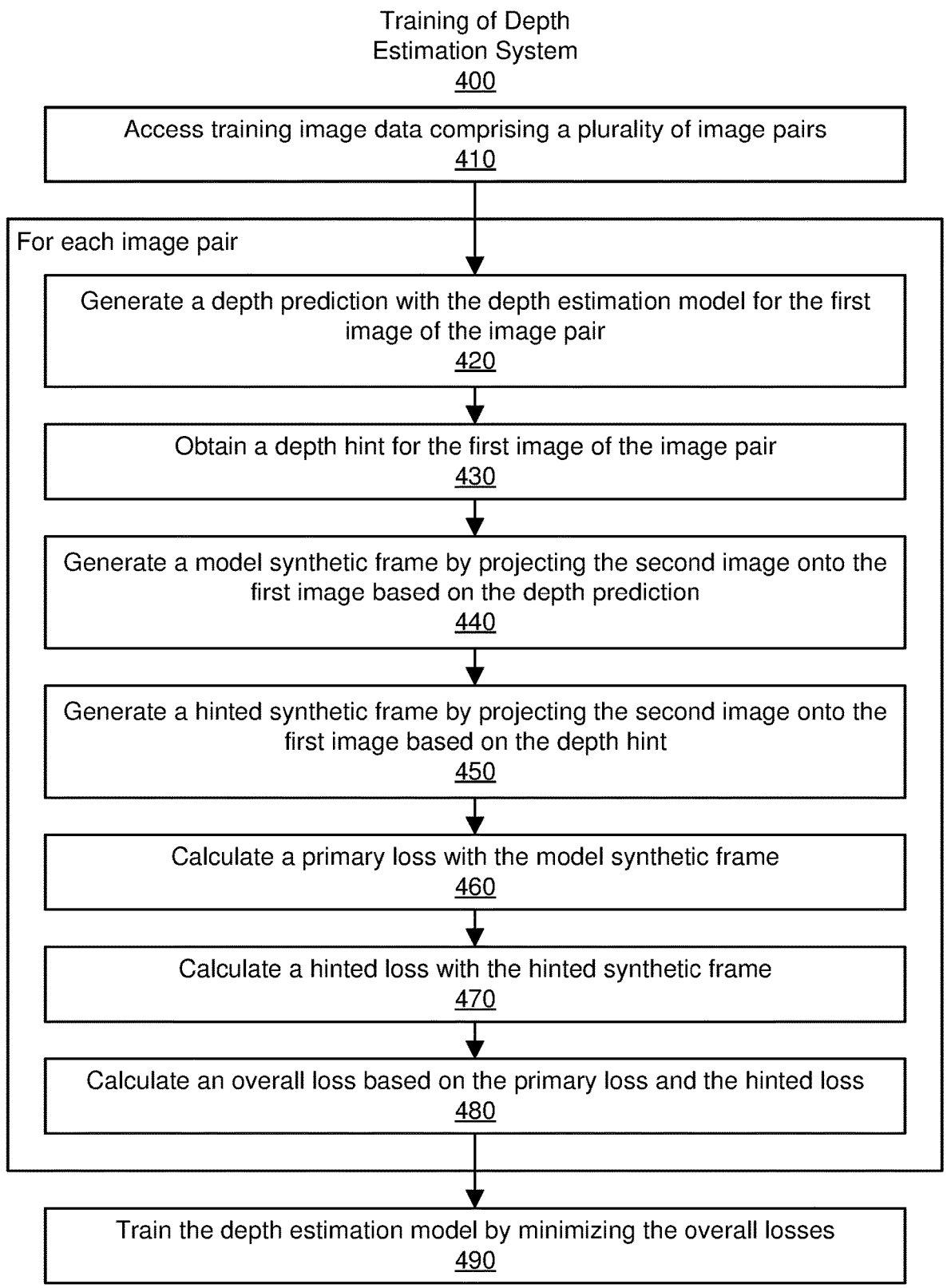
FIG. 4 is a flowchart describing a general process of training a depth estimation model with stereoscopic image data and depth hints, in accordance with one or more embodiments.

FIG. 4 is a flowchart describing a general process 400 of training the depth estimation model with image pairs, in accordance with one or more embodiments. The process 400 yields a trained depth estimation model 130 that can generate a depth map given an input image. The process 400 is accomplished by the depth estimation training system 170 but may more generally be accomplished by any other computing device.

The depth estimation training system 170 accesses 410 training image data comprising a plurality of image pairs. The image pairs may include one or more true stereoscopic image pairs, one or more pseudo stereoscopic image pairs, or some combination thereof. Generally, a pose is known between each true stereoscopic image pair, whereas a pose is estimated for a pseudo stereoscopic image pair.

The depth estimation training system 170 performs operations 420-480 for each image pair trained on.

The depth estimation training system 170 generates 420 a depth prediction with the depth estimation model for the first image of the image pair. The first image is input into the depth estimation model 130 extracting a depth prediction comprising a depth prediction value per pixel of the first image. In one or more embodiments, the depth prediction module 175 generates the depth prediction.

The depth estimation training system 170 obtains 430 a depth hint for the first image of the image pair. The depth hint may be obtained from any of the various approaches described throughout this present disclosure. In one embodiment, the depth hint is obtained by inputting the image pair into an alternatively trained stereo depth estimation model. Other approaches include obtaining the depth hint from a SLAM module, a LIDAR, etc. In one or more embodiments, the hints module 180 generates the depth prediction.

The depth estimation training system 170 generates a model synthetic frame by projecting the second image onto the first image based on the depth prediction. The projection from the second image onto the first image may further be based on a first set of intrinsic parameters for the first image, a second set of intrinsic parameters for the second image, and a pose between the first image and the second image. In one or more embodiments, the image synthesis module 185 accomplishes the projections.

The depth estimation training system 170 generates 450 a hinted synthetic frame by projecting the second image onto the first image based on the depth hint. For the hinted synthetic frame, projection relies on the depth hint in place of the depth prediction. In embodiments with pose hints, the pose hint is used to generate an additional hinted synthetic frame. In one or more embodiments, the image synthesis module 185 accomplishes the projections.

The depth estimation training system 170 calculates 460 a primary loss with the model synthetic frame. The primary loss is a photometric reconstruction error based on a comparison of the model synthetic frame and the first image. The primary loss for the depth prediction comprises a primary loss value per pixel of the first image.

The depth estimation training system 170 calculates 470 a hinted loss with the hinted synthetic frame. The hinted loss is a photometric reconstruction error based on a comparison of the hinted synthetic frame and the first image. The hinted loss for the depth hint comprises a hinted loss value per pixel of the first image. Additional hinted losses may be calculated for additional hinted synthetic frames, e.g., one hinted synthetic frame is based on a pose hint, another hinted synthetic frame is based on a depth hint and a pose hint, or yet another hinted synthetic frame is based on a second depth hint obtained differently than the first.

The depth estimation training system 170 calculates 480 an overall loss based on the primary loss and the hinted loss. The overall loss sums a contribution from each pixel of the first image. The contribution of a given pixel is based on whether the primary loss or the hinted loss is smaller. If the primary loss is smaller than or equal to the hinted loss at that pixel, the pixel's contribution to the overall loss is the primary loss value. If the hinted loss if smaller than the primary loss at that pixel, the pixel's contribution to the overall loss is a sum of the primary loss value and a supervised depth loss between the depth prediction and the depth hint at that pixel. In one embodiment, the supervised depth loss measures the absolute difference between the depth prediction and the depth hint. In another embodiment, the supervised depth loss measures the logarithm of the absolute different between the depth prediction and the depth hint. In one or more embodiments, the loss calculation module 190 calculates the primary loss, the hinted loss, and the overall loss. The overall loss for any training image pair without a depth hint may be based solely on the primary loss, i.e., contribution of each pixel to the overall loss for a training image pair is the primary loss value.

The depth estimation training system 170 trains 490 the depth estimation model 130 by minimizing the overall losses of the image pairs. In minimizing the loss, the depth estimation training system 170 refines parameters of the depth estimation model 130 for estimating depth from a single-color input image.

Depth Estimation Model

Figure 5:
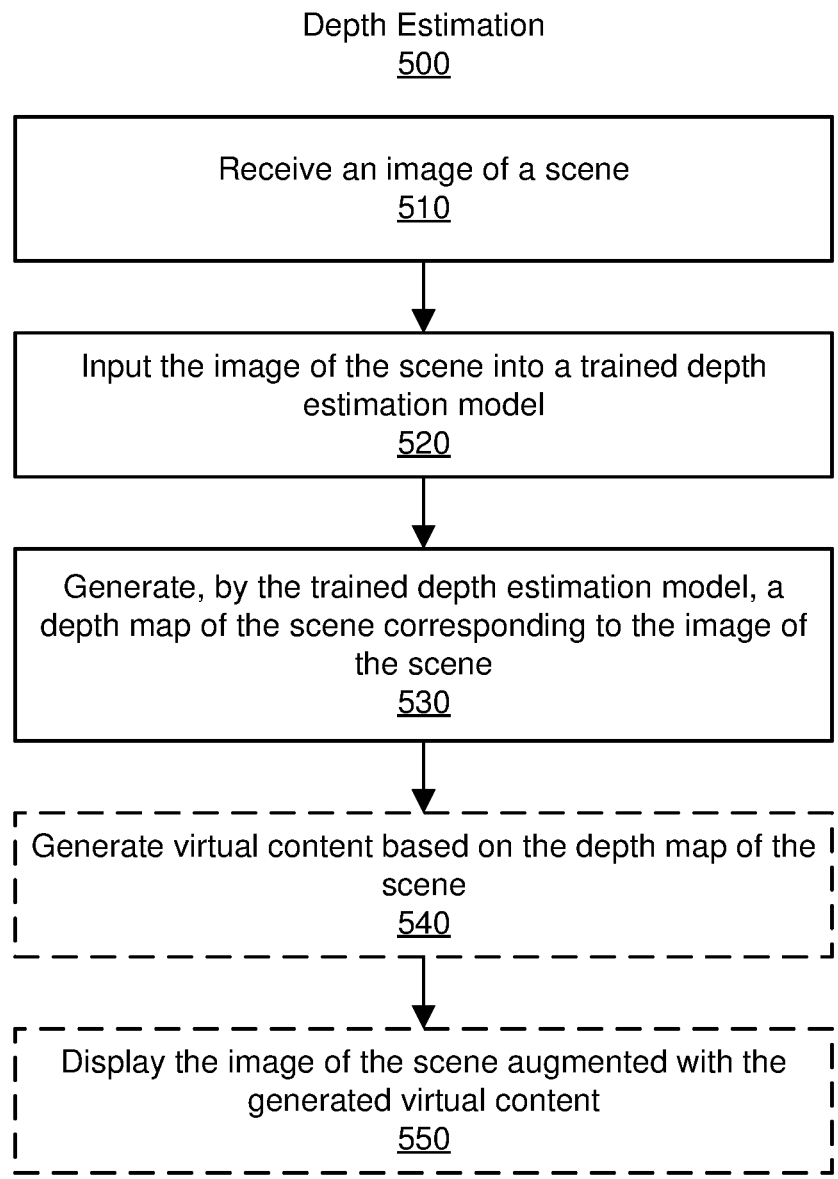
FIG. 5 is a flowchart describing an example use of a depth estimation model trained using depth hints in an augmented reality application, according to one or more embodiments.

FIG. 5 is a flowchart describing a general process 500 of using a depth estimation model, in accordance with one or more embodiments. The process 500 results in a depth map given an input image. The process 500 may be accomplished by a client device 110 having a trained depth estimation model. The client device can be a generic computing device and may have a camera as well. In some embodiments, the client device is implemented in the parallel reality game described in FIGS. 1-3 above. Although the following description is within the context of a client device, the process 500 may be performed on other computing devices.

The client device 110 receives 510 an image of a scene. The image of the scene may be captured by a camera that is a component of the client device 110 or external to the client device 110. In the context of the parallel reality game, the scene may be of real-world locations that may map to virtual locations in the virtual world. The image of the scene may also have intrinsics corresponding to the geometric properties of the camera that captured the image. The image may be a single image captured by the camera. Alternatively, the image may be a frame from video being captured by the camera.

The client device 110 inputs 520 the image of the scene into a trained depth estimation model. The depth estimation model may be trained by the depth estimation system 170, e.g., via the process 400 of FIG. 4, the process 600 of FIG. 6, or some combination thereof. The depth estimation model receives the image of the scene, and, in some embodiments, the intrinsics of the image as well.

The client device 110 generates 530, by the trained depth estimation model, a depth map of the scene corresponding to the image of the scene. Each pixel of the depth map has a depth value describing a relative distance of a surface at the corresponding pixel in the image of the scene. The depth estimation receives the image of the scene and outputs the depth map based on the parameters trained for the depth estimation model.

The client device 110 may perform various additional operations with the generated depth map. For example, the client device 110 may be an autonomous vehicle capable of navigating in a real-world environment with the depth map. In another example, the client device 110 is part of an augmented reality system and can present real-world imagery augmented with virtual content. To accomplish this task, the client device 110 may utilize the generated depth map to generate the virtual content, resulting in virtual content interacting at correct depths with objects in the real-world imagery. Steps for generating augmented content are exampled below.

In additional embodiments, the client device 110 generates 540 virtual content based on the depth map of the scene. The virtual content can be sourced from content for the parallel reality game, e.g., stored in the game database 115. The virtual content generated may be augmented reality content that can be augmented onto the image of the scene. For example, a virtual character is generated that can move about the scene with understanding of depth of the scene. In one instance, the virtual character can grow in size as the virtual character is walking on a street towards the user. In another instance, the virtual character can duck behind a tree where a portion of the virtual character is then occluded by the tree.

The client device 110 displays 550 the image of the scene augmented with the virtual content. The client device includes an electronic display. The electronic display can provide a constant feed of video captured by the camera with augmented virtual content.

Following the example above, the parallel reality game might provide interacting with the virtual character as an objective. In order to interact with the virtual character, a user of the mobile device may need to move their mobile device around while keeping the virtual character in a field of view of the camera. As the user moves the mobile device around, the mobile device can continually capture video or image data which can be used to iteratively generate depth information of the scene as the scene is changing with the user's movement of the mobile device. The mobile device can update the video feed on the display while also updating the virtual character based on generated depth information so that the user would perceive the virtual character as always interacting appropriately within the scene, e.g., not walking through objects, not having portions that are cut off without any object occluding those portions, etc.

Example Computing System

Figure 6:
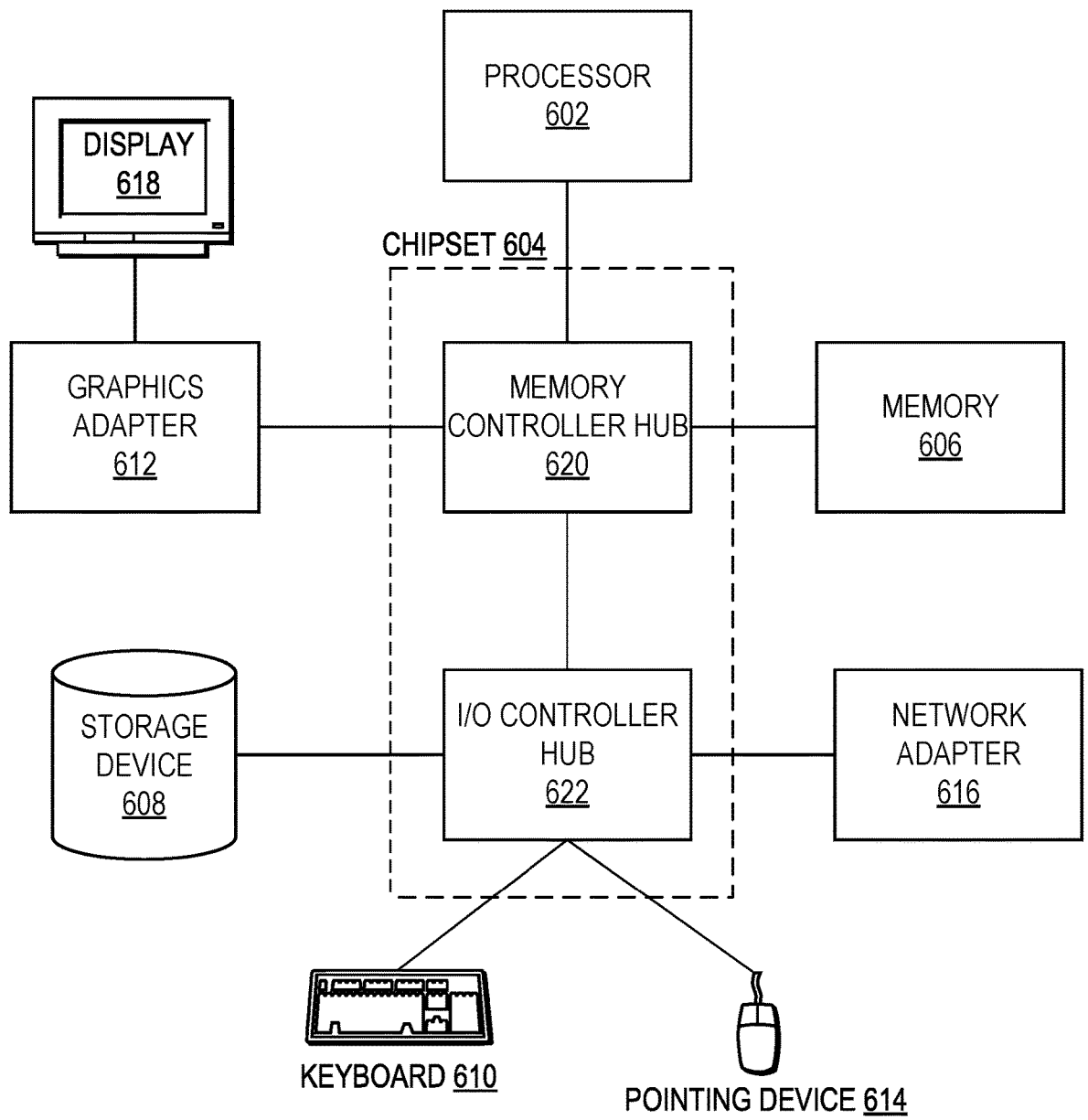
FIG. 6 illustrates an example computer system suitable for use in training or applying a depth estimation model, according to one or more embodiments.

FIG. 6 is an example architecture of a computing device, according to an embodiment. Although FIG. 6 depicts a high-level block diagram illustrating physical components of a computer used as part or all of one or more entities described herein, in accordance with an embodiment, a computer may have additional, less, or variations of the components provided in FIG. 6. Although FIG. 6 depicts a computer 600, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 6 are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In some embodiments, the computer 600 includes one or more communication buses for interconnecting these components. The one or more communication buses optionally include circuitry (sometimes called a chipset) that interconnects and controls communications between system components.

The storage device 608 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 608 can also be referred to as persistent memory. The pointing device 614 may be a mouse, track ball, or other type of pointing device, and is used in combination with the keyboard 610 to input data into the computer 600. The graphics adapter 612 displays images and other information on the display 618. The network adapter 616 couples the computer 600 to a local or wide area network.

The memory 606 holds instructions and data used by the processor 602. The memory 606 can be non-persistent memory, examples of which include high-speed random-access memory, such as DRAM, SRAM, DDR RAM, ROM, EEPROM, flash memory.

As is known in the art, a computer 600 can have different and/or other components than those shown in FIG. 13. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method comprising:
   receiving an image of a scene;
   inputting the image into a depth estimation model that was trained by a process comprising:
      accessing training image data comprising a plurality of image pairs, each image pair comprising a first image and a second image;
      for each image pair:
         generating, by the depth estimation model, depth prediction values for pixels of the first image;
         obtaining depth hint values for the pixels of the first image;
         projecting the second image onto the first image based on the depth prediction values for the pixels of the first image to generate a model synthetic frame;
         projecting the second image onto the first image based on the depth hint values for the pixels of the first image to generate a hinted synthetic frame;
         calculating primary loss values for the depth prediction values based on a comparison of the pixels of the model synthetic frame and the pixels of the first image;
         calculating hinted loss values for the depth hint values based on a comparison of the pixels of the hinted synthetic frame and the pixels of the first image; and
         calculating an overall loss for the image pair, wherein contribution of a given pixel in the first image to the overall loss is determined based on whether the primary loss value or hinted loss value is smaller, wherein the contribution of a first pixel in the first image with a hinted loss value smaller than a primary loss value comprises the primary loss value and a supervised depth loss value based on a depth prediction value and a depth hint value for the first pixel;

adjusting the parameters of the depth estimation model based on the overall losses of the image pairs; and generating, by the depth estimation model, a depth map of the scene corresponding to the image of the scene.

2. The method of claim 1, wherein each image pair is a true stereoscopic image pair captured by a pair of cameras.

3. The method of claim 1, wherein each image pair is a pseudo stereoscopic image pair, wherein the first image and the second image are temporally distinct frames captured by a single camera.

4. The method of claim 1, wherein projecting the second image onto the first image in each image pair is further based on a pose between the first image and the second image.

5. The method of claim 1, wherein projecting the second image onto the first image is further based on a first set of camera intrinsic parameters for the first image and a second set of camera intrinsic parameters for the second image.

6. The method of claim 1, wherein the primary loss value at a pixel according to a depth prediction value is based on a differential between the pixel of the model synthetic frame and the pixel of the first image, and wherein the hinted loss value at the pixel according to a depth hint value is based on a differential between the pixel of the hinted synthetic frame and the pixel of the first image.

7. The method of claim 1,
wherein the contribution of a given pixel to the overall loss is the primary loss value of the given pixel, if the primary loss value is smaller than or equal to the hinted loss value at the given pixel; and
wherein the contribution of the given pixel to the overall loss is a sum of the primary loss value of the given pixel and a differential between a depth prediction value and a depth hint value at the given pixel, if the hinted loss value is smaller than the primary loss value at the given pixel.

8. The method of claim 1, wherein the depth hint values are generated by a stereo depth estimation model configured to input the image pair and to output the depth hint values based on the image pair.

9. The method of claim 1, wherein the depth hint values are generated by a simultaneous-localization-and-mapping (SLAM) module based on the image pair.

10. A computer-implemented method for training a depth estimation model comprising:
accessing training image data comprising a plurality of image pairs, each image pair comprising a first image and a second image;
for each image pair:
generating, by the depth estimation model, depth prediction values for pixels of the first image;
obtaining depth hint values for the pixels of the first image;
projecting the second image onto the first image based on the depth prediction values for the pixels of the first image to generate a model synthetic frame;
projecting the second image onto the first image based on the depth hint values for the pixels of the first image to generate a hinted synthetic frame;
calculating primary loss values for the depth prediction values based on a comparison of the pixels of the model synthetic frame and the pixels of the first image;

calculating hinted loss values for the depth hint values based on a comparison of the pixels of the hinted synthetic frame and the pixels of the first image; and calculating an overall loss for the image pair, the contribution of a given pixel in the first image to the overall loss determined based on whether the primary loss value or hinted loss value is smaller, wherein the contribution of a first pixel in the first image with a hinted loss value smaller than a primary loss value comprises the primary loss value and a supervised depth loss value based on a depth prediction value and a depth hint value for the first pixel;

adjusting the parameters of the depth estimation model based on the overall losses of the image pairs.

11. The method of claim 10, wherein each image pair is a true stereoscopic image pair captured by a pair of cameras.

12. The method of claim 10, wherein each image pair is a pseudo stereoscopic image pair, wherein the first image and the second image are temporally distinct frames captured by a single camera.

13. The method of claim 10, wherein projecting the second image onto the first image in each image pair is further based on a pose between the first image and the second image.

14. The method of claim 10, wherein projecting the second image onto the first image is further based on a first set of camera intrinsic parameters for the first image and a second set of camera intrinsic parameters for the second image.

15. The method of claim 10, wherein the primary loss value at a pixel according to a depth prediction value is based on a differential between the pixel of the model synthetic frame and the pixel of the first image, and wherein the hinted loss value at the pixel according to a depth hint value is based on a differential between the pixel of the hinted synthetic frame and the pixel of the first image.

16. The method of claim 10,
wherein the contribution of a given pixel to the overall loss is the primary loss value of the given pixel, if the primary loss value is smaller than or equal to the hinted loss value at the given pixel; and
wherein the contribution of the given pixel to the overall loss is a sum of the primary loss value of the given pixel and a differential between a depth prediction value and a depth hint at the given pixel, if the hinted loss value is smaller than the primary loss value at the given pixel.

17. The method of claim 10, wherein the depth hint values are generated by a stereo depth estimation model configured to input the image pair and to output the depth hint values based on the image pair.

18. The method of claim 10, wherein the depth hint values are generated by a simultaneous-localization-and-mapping (SLAM) module based on the image pair.

19. A non-transitory computer-readable storage medium storing instructions that, when executed by a processor, cause the processor to perform operations comprising:
receiving an image of a scene;
inputting the image into a depth estimation model that was trained by a process comprising:
accessing training image data comprising a plurality of image pairs, each image pair comprising a first image and a second image;
for each image pair:
generating, by the depth estimation model, depth prediction values for pixels of the first image;
obtaining depth hint values for the pixels of the first image;

projecting the second image onto the first image based on the depth prediction values for the pixels of the first image to generate a model synthetic frame;

projecting the second image onto the first image based on the depth hint values for the pixels of the first image to generate a hinted synthetic frame;

calculating primary loss values for the depth prediction values based on a comparison of the pixels of the model synthetic frame and the pixels of the first image;

calculating hinted loss values for the depth hint values based on a comparison of the pixels of the hinted synthetic frame and the pixels of the first image; and calculating an overall loss for the image pair, the contribution of a given pixel in the first image to the overall loss determined based on whether the primary loss value or hinted loss value is smaller, wherein the contribution of a first pixel in the first image with a hinted loss value smaller than a primary loss value comprises the primary loss value and a supervised depth loss value based on a depth prediction value and a depth hint value for the first pixel;

adjusting the parameters of the depth estimation model based on the overall losses of the image pairs; and generating, by the depth estimation model, a depth map of the scene corresponding to the image of the scene.

20. The storage medium of claim 19, wherein the contribution of a given pixel to the overall loss is the primary loss value of the given pixel, if the primary loss value is smaller than or equal to the hinted loss value at the given pixel; and wherein the contribution of the given pixel to the overall loss is a sum of the primary loss value of the given pixel and a differential between a depth prediction value and a depth hint at the given pixel, if the hinted loss value is smaller than the primary loss value at the given pixel.

* * * * *